United States Patent
Tang et al.

(10) Patent No.: US 10,777,014 B2
(45) Date of Patent: Sep. 15, 2020

(54) METHOD AND APPARATUS FOR REAL-TIME VIRTUAL REALITY ACCELERATION

(71) Applicant: ALLWINNER TECHNOLOGY CO., LTD., Zhuhai, Guangdong (CN)

(72) Inventors: Yupu Tang, Guangdong (CN); Jun Zhang, Guangdong (CN)

(73) Assignee: ALLWINNER TECHNOLOGY CO., LTD., Zhuhai (CN)

(*) Notice: Subject to any disclaimer, the term of this patent is extended or adjusted under 35 U.S.C. 154(b) by 0 days.

(21) Appl. No.: 16/346,125

(22) PCT Filed: Sep. 11, 2017

(86) PCT No.: PCT/CN2017/101248
§ 371 (c)(1),
(2) Date: Apr. 30, 2019

(87) PCT Pub. No.: WO2018/201652
PCT Pub. Date: Nov. 8, 2018

(65) Prior Publication Data
US 2019/0279427 A1    Sep. 12, 2019

(30) Foreign Application Priority Data

May 5, 2017    (CN) .......................... 2017 1 0310655

(51) Int. Cl.
*G06T 19/00*    (2011.01)
*G06T 3/40*    (2006.01)
(Continued)

(52) U.S. Cl.
CPC ............. *G06T 19/006* (2013.01); *G06T 1/20* (2013.01); *G06T 3/4007* (2013.01); *G06T 5/005* (2013.01); *G06T 2200/28* (2013.01)

(58) Field of Classification Search
None
See application file for complete search history.

(56) References Cited

U.S. PATENT DOCUMENTS 6,897,883 B1 * 5/2005 Kumata ............... H04N 5/2259
                                                                345/672
9,824,498 B2 * 11/2017 Mallinson ............ G06T 19/006
(Continued)

*Primary Examiner* — David H Chu

(57) ABSTRACT

A real-time virtual reality (VR) acceleration method, includes: obtaining an input image (101); partitioning an output image buffer into M rows and N columns of rectangular grid blocks (103); calculating, according to an algorithm integrating anti-distortion, anti-dispersion, and asynchronous time warping (ATW), vertex coordinates of input image grid blocks corresponding to the output image buffer grid blocks (105); calculating two-dimensional mapping coefficients of each pair of grid blocks in the output image buffer and the input image (107); calculating, according to the two-dimensional mapping coefficients, coordinates of an output image pixel corresponding to an input image pixel (109); selecting at least four pixels adjacent to the coordinates of the input image pixel, to calculate the output image pixel value (111); and outputting an image after anti-distortion, anti-dispersion, and ATW (113). VR experience effect of reducing GPU load, reducing bandwidth consumption, decreasing delay, and no dizziness is achieved.

36 Claims, 5 Drawing Sheets

(51) Int. Cl.
*G06T 5/00* (2006.01)
*G06T 1/20* (2006.01)

(56) References Cited

U.S. PATENT DOCUMENTS

| | | | | |
|---|---|---|---|---|
| 2003/0052878 | A1* | 3/2003 | Han | G06T 15/205 |
| | | | | 345/420 |
| 2004/0207733 | A1* | 10/2004 | Nose | G06T 3/0018 |
| | | | | 348/222.1 |
| 2009/0067749 | A1* | 3/2009 | Schiewe | H04N 9/3185 |
| | | | | 382/294 |
| 2013/0107055 | A1* | 5/2013 | Kasuga | H04N 7/181 |
| | | | | 348/148 |
| 2015/0143237 | A1* | 5/2015 | Shindo | H04N 1/3877 |
| | | | | 715/273 |
| 2016/0189350 | A1* | 6/2016 | Glotzbach | G06T 5/006 |
| | | | | 345/647 |
| 2016/0314564 | A1* | 10/2016 | Jones | G06T 15/04 |
| 2016/0321787 | A1* | 11/2016 | Zhao | G02B 27/017 |
| 2016/0379335 | A1* | 12/2016 | Kwon | G06T 1/20 |
| | | | | 345/506 |
| 2017/0192734 | A1* | 7/2017 | Nie | G06F 3/147 |
| 2017/0316607 | A1* | 11/2017 | Khalid | G06F 3/147 |
| 2018/0088890 | A1* | 3/2018 | Pohl | G06F 3/017 |
| 2018/0365797 | A1* | 12/2018 | Yu | G06T 3/0018 |
| 2019/0289327 | A1* | 9/2019 | Lin | H04N 19/82 |

* cited by examiner

METHOD AND APPARATUS FOR REAL-TIME VIRTUAL REALITY ACCELERATION

FIELD OF THE INVENTION

The present invention relates to the field of virtual reality, and specifically, to a real-time virtual reality (VR) acceleration method and apparatus.

BACKGROUND OF THE INVENTION

VR head-mounted display lens distortion can maximize covering of the warping of a visual range of a person, to present a larger field of view and enhance sense of immersion of experience. When an image on a display screen is amplified by using a lens, the image is distorted. To cancel the distortion, the image needs to be stretched and warped. In this way, an undistorted image is projected to the eye's retina. The technology is referred to as anti-distortion.

A rainbow is formed when a white light is made to pass through a prism. That is because different colors have different light refractive indexes. A same scenario occurs at the edge of a VR lens. To resolve the problem, a practice similar to anti-distortion is used. According to a principle of optical path reversibility, anti-dispersion is first performed before an image enters the lens. In this way, the image through the lens is normal. The technology is referred to as anti-dispersion.

Asynchronous time warping (ATW) is a technology for generating an intermediate frame. When a game or video image cannot keep a sufficient frame rate, the ATW can generate the intermediate frame, thereby effectively reducing video jitter of the image. When a VR device is used, head moves excessively quickly, resulting in delay of scenario rendering. The time warping warps, based on a direction, an image before being sent to a display, to resolve the delay problem. The ATW technology is widely applied to VR products and the like, effectively overcoming image jitter and delay, thereby reducing sense of dizziness.

Most of existing implementations are anti-distortion, anti-dispersion, and asynchronous time shift that are based on GPU acceleration, typically including a Gear VR product, an oculus VR head-mounted display product, and a cardboard head-mounted display product. All the products pose a challenge to GPU performance, DDR speed, display latency, and overall power consumption. The prior art mainly has the following defects: the anti-distortion, the anti-dispersion, and the ATW are performed in steps by using GPU or through software operation; anti-distortion, anti-dispersion, ATW calculation need to cost GPU load and system load; ATW requires GPU hardware to support a proper preemption granularity, and requires an operating system and a driver program to support GPU preemption; during implementation, GPU processing is in memory-memory mode, consuming much bandwidth, and resulting in increased power consumption; and the GPU uses an offline mode, additionally increasing the processing delay and making VR experience worse.

SUMMARY OF THE INVENTION

A technical solution used by the present invention to resolve the technical problems is to provide a real-time VR acceleration method, including: step 1, obtaining an input image; step 2, partitioning an output image buffer into M rows and N columns of rectangular grid blocks, and outputting vertex coordinates of the rectangular grid blocks; step 3, calculating, according to an algorithm model integrating anti-distortion, anti-dispersion, and ATW, vertex coordinates of input image grid blocks that correspond to the vertex coordinates of the output image buffer grid blocks; step 4, calculating two-dimensional mapping coefficients of each pair of grid blocks in the output image buffer and the input image according to the vertex coordinates of the output image buffer grid blocks and the corresponding vertex coordinates of the input image grid blocks; step 5, calculating, according to the two-dimensional mapping coefficients, coordinates of an input image pixel corresponding to an output image pixel; step 6, selecting pixel values of at least four pixels adjacent to the coordinates of the input image pixel corresponding to the output image pixel, to calculate a pixel value of the output image pixel; and step 7, outputting an image obtained after the anti-distortion, the anti-dispersion, and the ATW.

The input image in the step 1 is a video image obtained after spherical transformation.

The values of M and N in the step 2 are a power of 2.

The step 4 includes: calculating two-dimensional mapping coefficients of R, G, and B components of the pair of grid blocks in the output image buffer and the input image according to the vertex coordinates of the output image buffer grid blocks and the corresponding vertex coordinates of the input image grid blocks.

The step 5 includes: respectively calculating, according to the two-dimensional mapping coefficients of the R, G, and B components, coordinates of R, G, and B components of the input image pixel that correspond to R, G, and B components of the output image pixel.

The step 5 of calculating, according to the two-dimensional mapping coefficients, coordinates of a pixel in the input image that is corresponding to a pixel in the output image buffer is completed by hardware circuit.

The step 6 of selecting pixel values of at least four pixels adjacent to the coordinates of the input image pixel corresponding to the output image pixel, to calculate a pixel value of the output image pixel is completed by hardware circuit.

The step 6 includes: selecting the pixel values of the at least four pixels adjacent to the coordinates of the input image pixel corresponding to the output image pixel, and performing interpolation calculation by using a bilinear interpolation algorithm or a bicubic interpolation algorithm, to calculate the pixel value of the output image pixel.

The image that is output in the step 7 and that is obtained after the anti-distortion, the anti-dispersion, and the ATW is directly displayed after image synthesis.

The present invention further provides a real-time VR acceleration apparatus, including an input image buffering module, an output image buffer partitioning module, a mapping coefficient calculation module, and an image calculation module. The input image buffering module receives and stores an input image. The output image buffer partitioning module partitions an output image buffer into M rows and N columns of rectangular grid blocks, and outputs vertex coordinates of all the grid blocks. The mapping coefficient calculation module calculates, according to an algorithm model integrating anti-distortion, anti-dispersion, and ATW, vertex coordinates of input image grid blocks that correspond to the vertex coordinates of the output image buffer grid blocks, and calculates two-dimensional mapping coefficients of each pair of grid blocks in the output image buffer and the input image according to the vertex coordinates of the output image buffer grid blocks and the corresponding vertex coordinates of the input image grid blocks.

The image calculation module calculates, according to the two-dimensional mapping coefficients, coordinates of an input image pixel corresponding to an output image pixel, and selects pixel values of at least four pixels adjacent to the coordinates of the input image pixel corresponding to the output image pixel, to calculate a pixel value of the output image pixel, to output an image obtained after the anti-distortion, the anti-dispersion, and the ATW.

The input image is a video image obtained after spherical transformation.

The values of M and N are a power of 2.

The mapping coefficient calculation module includes a vertex coordinate calculation unit and a mapping coefficient calculation unit. The vertex coordinate calculation unit calculates, according to the algorithm model integrating the anti-distortion, the anti-dispersion, and the ATW, the vertex coordinates of the input image grid blocks that correspond to the vertex coordinates of the output image buffer grid blocks. The mapping coefficient calculation unit calculates the two-dimensional mapping coefficients of the pair of grid blocks in the output image buffer and the input image according to the vertex coordinates of the output image buffer grid blocks and the corresponding vertex coordinates of the input image grid blocks.

The mapping coefficient calculation unit includes an R component mapping coefficient calculation unit, a G component mapping coefficient calculation unit, and a B component mapping coefficient calculation unit.

The calculating, by the image calculation module according to the two-dimensional mapping coefficients, coordinates of an input image pixel corresponding to an output image pixel; and selecting pixel values of at least four pixels adjacent to the coordinates of the input image pixel corresponding to the output image pixel, to calculate a pixel value of the output image pixel are completed by hardware circuit.

The image calculation module includes a coordinate calculator, a coordinate decider, a value selector, and an image interpolation generator. The coordinate calculator calculates, according to the two-dimensional mapping coefficients, the coordinates of the input image pixel corresponding to the output image pixel. The coordinate decider determines whether the coordinates obtained by the coordinate calculator are valid, where when the coordinates calculated by the coordinate calculator are out of a range of the coordinates of the input image, the coordinate decider determines that the coordinates of the input image pixel corresponding to the output image pixel are invalid, and the pixel value of the output image pixel is 0. The value selector selects, from the input image, pixel values of at least four pixels adjacent to valid coordinates determined by the coordinate decider. The image interpolation generator performs interpolation calculation according to the pixel values selected by the value selector, to calculate the pixel value of the output image pixel, and generates the image obtained after the anti-distortion, the anti-dispersion, and the ATW.

The coordinate calculator includes an R component coordinate calculation unit, a G component coordinate calculation unit, and a B component coordinate calculation unit.

When coordinates of the input image corresponding to R, G, and B components obtained by the coordinate calculator are out of the range of the coordinates of the input image, the coordinate decider determines that the coordinates of the input image corresponding to the R, G, and B components obtained by the coordinate calculator are invalid, and the pixel value of the output image pixel is 0.

The image interpolation generator includes a bilinear interpolation calculator or a bicubic interpolation calculator, configured to perform the interpolation calculation according to the pixel values selected by the value selector, to calculate the pixel value of the output image pixel, to generate the image obtained after the anti-distortion, the anti-dispersion, and the ATW.

The image that is output by the image calculation module and that is obtained after the anti-distortion, the anti-dispersion, and the ATW is directly displayed after image synthesis.

In the real-time VR acceleration method of the present invention, the output image buffer is partitioned into grids, and the vertices are obtained, and then three functions of anti-distortion, anti-dispersion, and ATW, are integrated to one software. Vertex coordinates of corresponding input image grids are obtained by software vertex rendering. Then for the vertex coordinates of corresponding grids of the input and output images, a set of coefficients integrating the functions of anti-distortion, anti-dispersion, and ATW are calculated by using two-dimensional mapping. Finally, an output image is obtained by input image interpolation. The method effectively makes use of GPU vertex rendering advantage, reducing a large amount of GPU interpolation calculation, and further effectively resolves problems of GPU load and resource preemption. In addition, the interpolation algorithm can be adaptively adjusted, to improve image definition, and superior to GPU rendering.

The present invention further provides a real-time VR acceleration apparatus. Two-dimensional mapping is performed between an input image and an output image by using a block mapping coefficient (M×N). Mapping of a target image to an original image is completed in a form of hardware lookup table. Finally, a final image is generated by interpolation. Rendering speed is increased, display delay is decreased, the GPU is released, and a system load is reduced. In addition, an algorithm model is flexibly integrated into vertex coordinates in a software form, to adapt to models such as a plurality of types of anti-distortion and ATW, without any modification of hardware. Online image acceleration processing needs only data reading and does not need data writing, reduces bandwidth consumption, reduces power consumption, reduces GPU and system load to reduce power consumption, further decreases delay, improve experience, and has no dizziness.

BRIEF DESCRIPTION OF THE DRAWINGS

The following further describes the present invention with reference to the accompanying drawings and embodiments. In the accompanying drawings.

DETAILED DESCRIPTION

With reference to accompanying drawing, exemplary embodiments of the present invention are described in detail.

Figure 1:
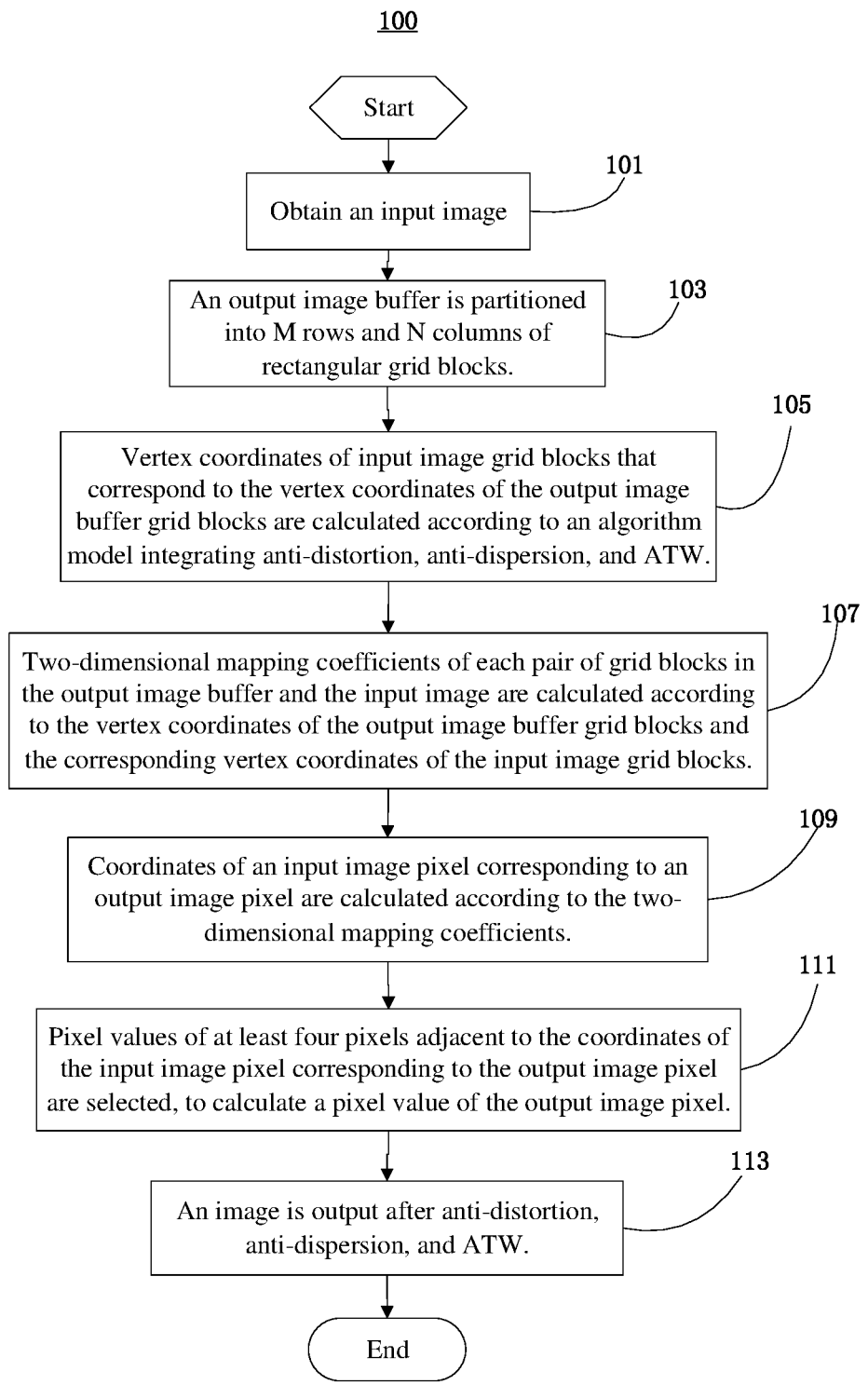
FIG. 1 is a block diagram of a process of a real-time VR acceleration method 100 according to an embodiment of the present invention.

FIG. 1 is a block diagram of a process of a real-time VR acceleration method 100 according to an embodiment of the present invention. In step 101, an input image is first obtained. The input image may be an image generated after a decoded video image is subjected to a spherical transformation, and is stored in a corresponding buffer. In a specific implementation, the image may be stored in an eye buffer. In step 103, an output image buffer is partitioned into M rows and N columns of rectangular grid blocks, and vertex coordinates of the rectangular grid blocks are output. In step 105, vertex coordinates of input image grid blocks that correspond to the vertex coordinates of the output image buffer grid blocks are calculated according to an algorithm model integrating anti-distortion, anti-dispersion, and ATW. In a specific implementation, various algorithm models integrating anti-distortion, anti-dispersion, and ATW in the prior arts may be used to calculate the vertex coordinates. In step 107, two-dimensional mapping coefficients of each pair of grid blocks in the output image buffer and the input image are calculated according to the vertex coordinates of the output image buffer grid blocks and the corresponding vertex coordinates of the input image grid blocks. In a specific implementation, mapping coefficients of R, G, and B components of each pair of grid blocks may be calculated respectively. In step 109, coordinates of an input image pixel corresponding to an output image pixel are calculated according to the two-dimensional mapping coefficients. In step 111, pixel values of at least four pixels adjacent to the coordinates of the input image pixel corresponding to the output image pixel are selected, to calculate a pixel value of the output image pixel. In a specific implementation, the coordinates of the pixel in the input image that is corresponding to the pixel in the output image buffer may be calculated in row scanning for the grid blocks in the output image buffer according to the two-dimensional mapping coefficients, and the pixel value of the output image may be calculated in row scanning. In step 113, an image is output after anti-distortion, anti-dispersion, and ATW.

The output image buffer is partitioned into grids. Then, through software calculation, vertex coordinates of input and output image blocks are interpolated by two-dimensional mapping, to implement the functions of anti-distortion, anti-dispersion, and ATW. In addition, these three functions are integrated together by using a set of coefficients to be completed once and for all. VR acceleration is realized, and the problems of GPU load and resource preemption are effectively resolved. In addition, the algorithm models are flexibly integrated into vertex coordinates calculation through software, to adapt to various anti-distortion, anti-dispersion, and ATW models.

In an implementation, the input image may be a video image obtained after spherical transformation.

In an implementation, the lengths of sides of the rectangular grid block of the partitioned output image buffer, M and N, each may be a power of 2, thereby reducing the amount of calculation and the calculation time.

In a specific implementation, it is assumed that the vertex coordinates of an output image buffer grid block are $\{x',y'\}$, and the corresponding coordinates in the input image are $\{x,y\}$. The following formulas are then satisfied:

$$A(x,y)=1+k1*(x*x)+k2*(y*y);$$

$$x=x'*A(x,y); \text{ and}$$

$$y=y'*A(x,y);$$

where $A(x, y)$ represents the coordinates gain at $(x, y)$, and k1 and k2 represent horizontal and vertical distortion factors of the image. After the coordinates $(x, y)$ in the input image are calculated, $p=\{x,y\}$ is set to be a two-dimensional point in anti-distortion and anti-dispersion grids, and a posture compensation matrix mat may be a 4×4 matrix, namely, a rotation matrix in three-dimensional space. According to matrix multiplication requirement, p should be a four-dimensional vector, so p may be extended as $P=\{x,y,-1,1\}$, and P is in a plane $z=-1$. $Q=P*mat$, where Q is a three-dimensional spatial point after the posture compensation matrix is applied. It is set that $Q=\{x',y',z',1\}$. Apparently, Q obtained through rotation is already not in the plane $z=-1$. Q needs to be mapped back to the plane $z=-1$. This is equivalent to calculating a point q at which a straight line (passing through Q and an origin) intersects the plane $(z=-1)$. A calculation method is as follows:

The equation of the straight line that passes through the spatial point Q is: $t=x/x'=y/y'=z/z'$. The following may be obtained by substituting $z=-1$ in the straight line equation:

$$t=-1/z';$$

$$x=x'*t;$$

$$y=y'*t; \text{ and}$$

$$q=\{x'*t, y'*t, -1, 1\};$$

where coordinates $(x'*t, y'*t)$ is the vertex coordinates of the input image grid blocks that correspond to the vertex coordinates of the output image buffer grid blocks.

In an implementation, the two-dimensional mapping coefficients of R, G, and B components of each pair of grid blocks in the output image buffer and the input image may be calculated according to the vertex coordinates of the output image buffer grid blocks and the corresponding vertex coordinates of the input image grid blocks. When only the algorithm of anti-distortion and ATW is calculated, the two-dimensional mapping coefficients of each pair of grid blocks in the output image buffer and the input image may be directly calculated. In a specific implementation, to facilitate implementation, two-dimensional mapping coefficients are stored according to row scanning mode. Each block stores the coefficients thereof according to the pixel component. The coefficients are a(a(R), a(G), a(B)), b(b(R), b(G), b(B)), c(c(R), c(G), c(B)), d(d(R), d(G), d(B)), e(e(R), e(G), e(B)), f(f(R), f(G), f(B)), g(g(R), g(G), g(B)), h(h(R), h(G), h(B)), β(β(R), β(G), and β(B)). The storing sequence is first storing 8×32 bits of R component, then 8×32 bits of G, 8×32 bits of B, and 8×32 bits of a constant term β component, and then next block data. 8×32 bits refers to eight (a, b, c, d, e, f, g, and h) 32 bits of data. The β component has only three 32 bits of R, G, and B, and is set to 8×32 bits for hardware design alignment.

In an implementation, coordinates of R, G, and B components of the pixel in the input image that correspond to R, G, and B components of the pixel in the output image buffer are respectively calculated according to the two-dimensional mapping coefficients of the R, G, and B components.

In an implementation, the step 109 of calculating, according to the two-dimensional mapping coefficients, the coordinates of an input image pixel corresponding to an output image pixel may be completed by hardware circuit. The step 111 of selecting pixel values of at least four pixels adjacent to the coordinates of the input image pixel corresponding to the output image pixel, to calculate a pixel value of the output image pixel may also be completed by hardware circuit. The algorithm models of anti-distortion, ATW, and anti-dispersion are integrated into input and output buffer grid coordinates, and an image interpolation effect is achieved through hardware table lookup, thereby online implementing processes such as anti-distortion, ATW, and anti-dispersion, reducing data reading and writing, decreasing bandwidth and power consumption, decreasing delay, and reducing dizziness.

In an implementation, a bilinear interpolation algorithm or a bicubic interpolation algorithm may be used, so that the pixel values of the at least four pixels adjacent to the coordinates of the input image pixel corresponding to the output image pixel are selected, and the pixel value of the corresponding pixel of the output image is obtained through interpolation calculation. VR acceleration is realized by partitioning grid vertices and performing interpolation calculation using two-dimensional mapping. Interpolation algorithm can be adaptively adjusted, to improve image definition, and to be superior to GPU rendering.

In a specific implementation, values of different quantities of pixels may be selected in the input image according to different interpolation algorithms to perform interpolation calculation, to obtain the pixel value of the output image pixel. When the bilinear interpolation algorithm is used, pixel values of four pixels adjacent to the coordinates of the input image pixel corresponding to the output image pixel may be selected to perform interpolation calculation. When the bicubic interpolation algorithm is used, pixel values of sixteen pixels adjacent to the coordinates of the input image pixel corresponding to the output image pixel may be selected to perform interpolation calculation.

In an implementation, an output image obtained after the anti-distortion, the anti-dispersion, and the ATW may be directly displayed on a display device after image synthesis.

Figure 2:
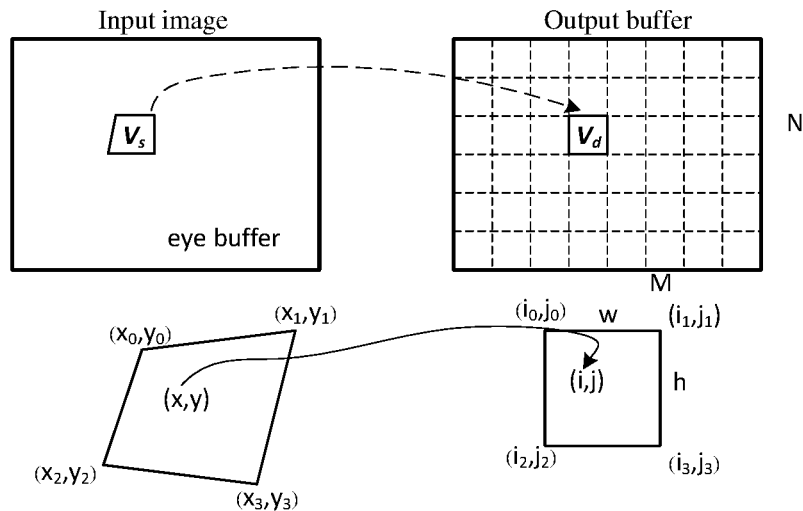
FIG. 2 is a schematic diagram of a two-dimensional mapping principle of an output image buffer grid block and an input image grid block according to an embodiment of the present invention.

FIG. 2 is a schematic diagram of two-dimensional mapping principle of an output image buffer grid block and an input image grid block according to an embodiment of the present invention. The following describes the process of the real-time VR acceleration method 100 shown in FIG. 1 in detail with reference to FIG. 2.

First, in step 101, a video image after spherical transformation is received, and is stored in an input buffer, such as an eye buffer.

Secondly, in step 103, an output buffer is partitioned into M*N blocks, and vertex coordinates of each grid block are output. For example, in the right figure in FIG. 2, four vertex coordinates of a grid block Vd in the output buffer are $(j_0, j_0)$, $(i_1, j_1)$, $(i_2, j_2)$, and $(i_3, j_3)$.

Thirdly, in step 105, the vertex coordinates of the input image grid blocks that correspond to the vertex coordinates of the output image buffer grid blocks are calculated according to an algorithm model integrating anti-distortion, anti-dispersion, and ATW. For example, four vertex coordinates of a grid block Vs in the input image that is corresponding to Vd in the left figure in FIG. 2 are $(x_0, y_0)$, $(x_1, y_1)$, $(x_2, y_2)$, and $(x_3, y_3)$.

Fourthly, in step 107, the two-dimensional mapping coefficients, namely, a, b, c, d, e, f, g, and h, of each pair of grid blocks in the output buffer and the input image are calculated according to the vertex coordinates of the output image buffer grid blocks and the corresponding vertex coordinates of the input image grid blocks. In a specific implementation, the following calculation formula may be used to calculate the two-dimensional mapping coefficients of the grid block Vd in the output buffer and the input image grid block Vs:

$$\begin{pmatrix} i_1 & j_1 & 1 & 0 & 0 & 0 & -i_1*x_1 & -j_1*x_1 \\ i_2 & j_2 & 1 & 0 & 0 & 0 & -i_2*x_2 & -j_2*x_2 \\ i_3 & j_3 & 1 & 0 & 0 & 0 & -i_3*x_3 & -j_3*x_3 \\ i_4 & j_4 & 1 & 0 & 0 & 0 & -i_4*x_4 & -j_4*x_4 \\ 0 & 0 & 0 & i_1 & j_1 & 1 & -i_1*y_1 & -j_1*y_1 \\ 0 & 0 & 0 & i_2 & j_2 & 1 & -i_2*y_2 & -j_2*y_2 \\ 0 & 0 & 0 & i_3 & j_3 & 1 & -i_3*y_3 & -j_3*y_3 \\ 0 & 0 & 0 & i_4 & j_4 & 1 & -i_4*y_4 & -j_4*y_4 \end{pmatrix} * \begin{pmatrix} a \\ b \\ c \\ d \\ e \\ f \\ g \\ h \end{pmatrix} = \begin{pmatrix} x_1 \\ x_2 \\ x_3 \\ x_4 \\ y_1 \\ y_2 \\ y_3 \\ y_4 \end{pmatrix}$$

Fifthly, in step 109, the coordinates of the pixel in the input image that is corresponding to each pixel in the output image buffer are calculated according to the two-dimensional mapping coefficients, namely, a, b, c, d, e, f, g, and h. In a specific implementation, the following calculation formulas may be used to calculate a pixel (x, y) of the input image grid block Vs that is corresponding to a pixel (i, j) in the grid block Vd in the right figure in FIG. 2:

$x=(a*i+b*j+c)/q$ $y=(d*i+e*j+f)/q$ $q=g*i+h*j+\beta$ where $\beta$ is a normalized constant.

Sixthly, in step 111, the pixel values of the at least four pixels adjacent to the pixel (x, y) in the input image grid block Vs are selected according to step 109, to perform interpolation calculation, to obtain a pixel value of the pixel (i, j) in the output buffer. In a specific implementation, bilinear interpolation algorithm can be used. Then four pixels adjacent to the pixel (x, y) may be selected. For example, bilinear interpolation calculation is performed on pixels (x, y+1), (x+1, y+1), (x+1, y) and (x−1, y−1), to obtain the pixel value of the pixel (i, j) in the output buffer. Alternatively, pixel values of sixteen pixels adjacent to the pixel (x, y) may also be selected to perform bicubic interpolation calculation, to obtain the pixel value of the pixel (i, j) in the output buffer.

Seventhly, in step 111, after pixel values of all pixels in the output buffer are calculated, in step 113, the image obtained after anti-distortion, anti-dispersion, and ATW is output, then is synthetized and superimposed with other image layers, and finally is directly sent, through a display channel, to a screen for displaying. In the present invention, the input image and the output image buffers are partitioned into grids through software calculation, to obtain the vertex coordinates of input and output image blocks. Then corresponding grid mapping coefficients are obtained by two-dimensional mapping. Finally, hard interpolation is used to implement the functions, of anti-distortion, ATW, and anti-dispersion. In addition, the three functions are integrated together by using a set of coefficients to be completed once and for all. VR acceleration is realized. The method effectively resolves problems of GPU load and resource preemption. In addition, the algorithm models can be flexibly integrated into vertex coordinates in a software form, to adapt to various anti-distortion, anti-dispersion, and ATW models.

Figure 3:
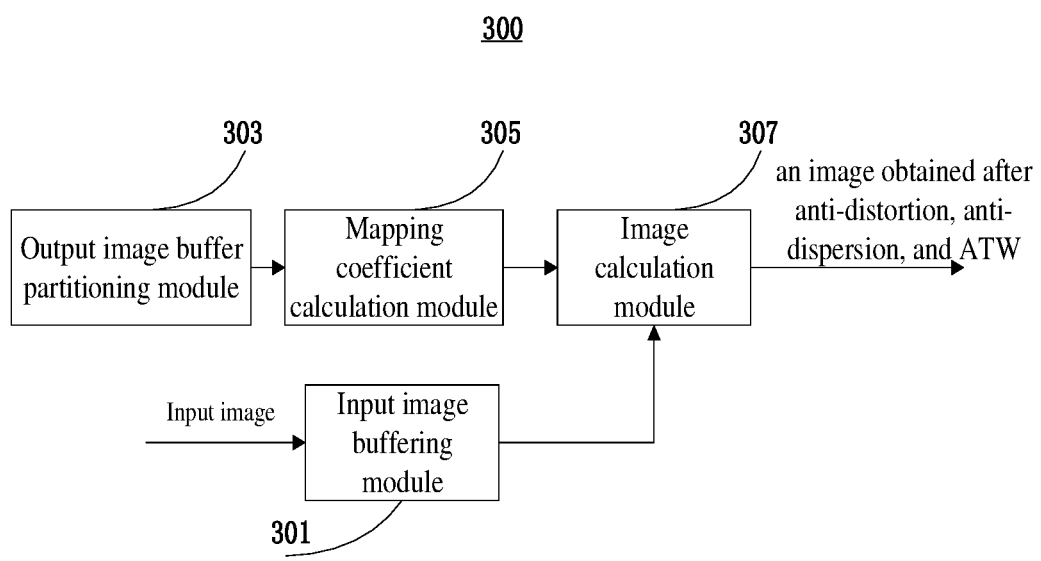
FIG. 3 is a block diagram of a real-time VR acceleration apparatus 300 according to an embodiment of the present invention.

FIG. 3 is a block diagram of a real-time VR acceleration apparatus 300 according to an embodiment of the present invention. The real-time VR acceleration apparatus 300 includes an input image buffering module 301, an output image buffer partitioning module 303, a mapping coefficient calculation module 305, and an image calculation module 307.

The input image buffering module 301 receives and stores an input image. In a specific implementation, the input image may be a video image obtained after spherical transformation, and may be stored in an eye buffer. The output image buffer partitioning module 303 partitions an output image buffer into M rows and N columns of rectangular grid blocks, and outputs vertex coordinates of all the grid blocks. The mapping coefficient calculation module 305 calculates, according to an algorithm model integrating anti-distortion, anti-dispersion, and ATW, vertex coordinates in the input image that correspond to the vertex coordinates of the output image buffer grid blocks, and calculates the two-dimensional mapping coefficients of each pair of grid blocks in the output image buffer and the input image according to the vertex coordinates of the output image buffer grid blocks and the corresponding vertex coordinates of the input image grid blocks. In a specific implementation, the algorithm model integrating anti-distortion, anti-dispersion, and ATW may be one of various algorithm models in the prior art. The image calculation module 307 calculates, according to the two-dimensional mapping coefficients, coordinates of an input image pixel corresponding to an output image pixel, and selects pixel values of at least four pixels adjacent to the coordinates of the input image pixel corresponding to the output image pixel, to calculate a pixel value of the output image pixel. In a specific implementation, the coordinates of the pixel in the input image buffer that is corresponding to the pixel in the output image may be calculated according to the two-dimensional mapping coefficients in row scanning for the output image, and the pixel value of the output image is calculated by interpolation by using the obtained input image pixel. When the values of all pixels in the output image are calculated, an image obtained after anti-distortion, anti-dispersion, and ATW is output.

The real-time VR acceleration apparatus 300, partitions the input image and the output image buffer into grids. Then, vertex coordinates of the input and output image blocks are interpolated by two-dimensional mapping, to implement the functions of anti-distortion, anti-dispersion, and ATW. In addition, the three functions are integrated together by using a set of coefficients to be completed once and for all. Problems of GPU load consumption and resource preemption are effectively resolved. the image calculation module can be implemented by hardware on a display channel. In addition, Image interpolation effect is achieved through hardware table lookup, thereby reducing data reading and writing, further decreasing bandwidth, and satisfying VR experience requirements such as reducing power consumption, decreasing delay, and having no dizziness.

In an implementation, the input image is a video image obtained after spherical transformation.

In an implementation, to facilitate hardware calculation, values of the M rows and the N columns of the grid blocks of the partitioned output image buffer may be a power of 2, thereby reducing the amount of calculation and calculation time.

Figure 4:
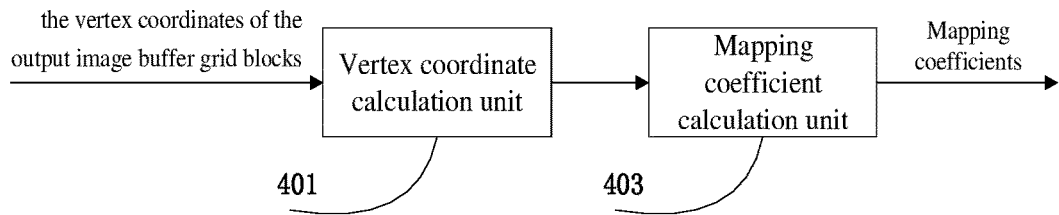
FIG. 4 is a block diagram of a mapping coefficient calculation module 400 according to an embodiment of the present invention.

In an implementation, as shown in FIG. 4, the mapping coefficient calculation module 400 may include a vertex coordinate calculation unit 401 and a mapping coefficient calculation unit 403. The vertex coordinate calculation unit 401 calculates, according to the algorithm model integrating anti-distortion, anti-dispersion, and ATW, the vertex coordinates in the input image that correspond to the vertex coordinates of the output image buffer grid blocks. The mapping coefficient calculation unit 403 calculates the two-dimensional mapping coefficients of each pair of grid blocks in the output image buffer and the input image according to the vertex coordinates of the output image buffer grid blocks and the corresponding vertex coordinates of the input image grid blocks. VR acceleration is realized by partitioning grid vertices, and performing interpolation using two-dimensional mapping.

In an implementation, the mapping coefficient calculation unit may include an R component mapping coefficient calculation unit, a G component mapping coefficient calculation unit, and a B component mapping coefficient calculation unit. Two-dimensional mapping coefficients of R, G, and B components are calculated by using the input and output grid coordinates. When only an algorithm of anti-distortion and ATW is calculated, the two-dimensional mapping coefficients of each pair of grid blocks in the output image buffer and the input image may be directly calculated. In a specific implementation, to facilitate implementation, the two-dimensional mapping coefficients calculated by the mapping coefficient calculation module 307 are stored in row scanning mode. Each block stores a coefficient thereof according to the pixel component, a(a(R), a(G), a(B)), b(b(R), b(G), b(B)), c(c(R), c(G), c(B)), d(d(R), d(G), d(B)), e(e(R), e(G), e(B)), f(f(R), f(G), f(B)), g(g(R), g(G), g(B)), h(h(R), h(G), h(B)), β(β(R), β(G), and β(B)). The storing sequence is first storing 8×32 bits of R component, 8×32 bits of G, 8×32 bits of B, and 8×32 bits of a constant term β component, and then next grid block of data. 8×32 bits refer to eight (a, b, c, d, e, f, g, and h) 32 bits of data. The β component has only three 32 bits of R, G, and B, and is set to 8×32 bits for hardware design alignment.

In an implementation, calculating, by the image calculation module according to the two-dimensional mapping coefficients, coordinates of an input image pixel corresponding to an output image pixel, and selecting pixel values of at least four pixels adjacent to the coordinates of the input image pixel corresponding to the output image pixel, to calculate a pixel value of the output image pixel may be completed by a hardware circuit. Processes such as anti-distortion, anti-dispersion, and ATW are implemented online. Only data reading is needed, and data writing is not needed, thereby decreasing bandwidth and power consumption, decreasing delay, and reducing dizziness.

Figure 5:
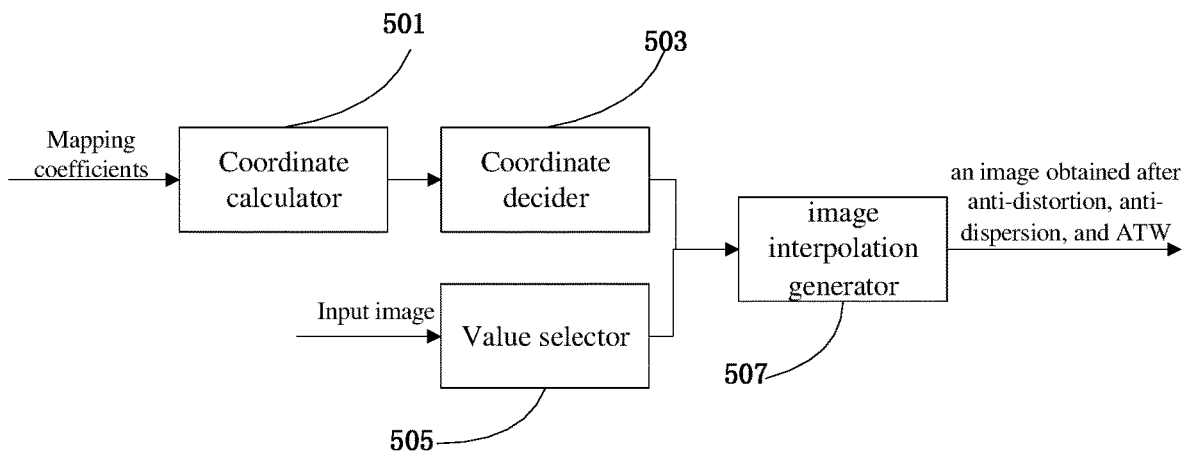
FIG. 5 is a circuit block diagram of an image calculation module 500 according to an embodiment of the present invention.

In an implementation, as shown in FIG. 5, the image calculation module may include a coordinate calculator 501, a coordinate decider 503, a value selector 505, and an image interpolation generator 507. The coordinate calculator 501 calculates, according to the two-dimensional mapping coefficients, the coordinates of the input image pixel corresponding to the output image pixel. The coordinate decider 503 determines whether the coordinates of the input image pixel corresponding to the output image pixel that are calculated by the coordinate calculator 501 are reasonable and valid. When the coordinates calculated by the coordinate calculator are out of a range of coordinates of the input image, the coordinate decider determines that the coordinates of the input image pixel corresponding to the output image pixel are invalid, and the pixel value of the output image pixel is 0. The value selector 505 selects, from the input image, pixel values of at least four pixels adjacent to the valid coordinates determined by the coordinate decider 503. The image interpolation generator 507 performs interpolation calculation according to the pixel values selected by the value selector 505, to calculate the pixel value of the output image pixel, and finally generates an image obtained after anti-distortion, anti-dispersion, and ATW.

In an implementation, the coordinate calculator may include an R component coordinate calculation unit, a G component coordinate calculation unit, and a B component coordinate calculation unit, and respectively calculates, according to the two-dimensional mapping coefficients of the R, G, and B components that are calculated by the mapping coefficient calculation module, coordinates of R, G, and B components of the pixel in the input image that correspond to R, G, and B components of the pixel in the output image buffer.

In an implementation, when coordinates of the input image corresponding to R, G, and B components obtained by the coordinate calculator are out of the range of coordinates of the input image, the coordinate decider determines that the coordinates of the input image corresponding to the R, G, and B components obtained by the coordinate calculator are invalid. In this case, the pixel value of the output image pixel is 0.

In an implementation, the image interpolation generator may include a bilinear interpolation calculator or a bicubic interpolation calculator. The bilinear interpolation calculator or the bicubic interpolation calculator performs the interpolation calculation according to the pixel values selected by the value selector, to calculate the pixel value of the output image pixel, to finally generate an image obtained after anti-distortion, anti-dispersion, and ATW. VR acceleration is realized by partitioning grid vertices, and performing interpolation calculation using two-dimensional mapping. The interpolation algorithm can be adaptively adjusted, to improve image definition, and superior to GPU rendering.

In a specific implementation, values of different numbers of pixels may be selected from the input image according to different algorithms of a interpolation calculator to perform interpolation calculation, to obtain the pixel value of the output image pixel. When a bilinear interpolation calculator is used, pixel values of four pixels adjacent to the coordinates of the input image pixel corresponding to the output image pixel may be selected to perform interpolation calculation. When a bicubic interpolation calculator is used, pixel values of sixteen pixels adjacent to the coordinates of the input image pixel corresponding to the output image pixel may be selected to perform interpolation calculation.

In an implementation, the image after anti-distortion, anti-dispersion, and ATW that is output by the image calculation module may be directly displayed on a display device after image synthesis. Processes such as anti-distortion, anti-dispersion, and ATW are implemented online, thereby reducing data reading and writing, decreasing bandwidth and power consumption, decreasing delay, and reducing dizziness.

Figure 6:
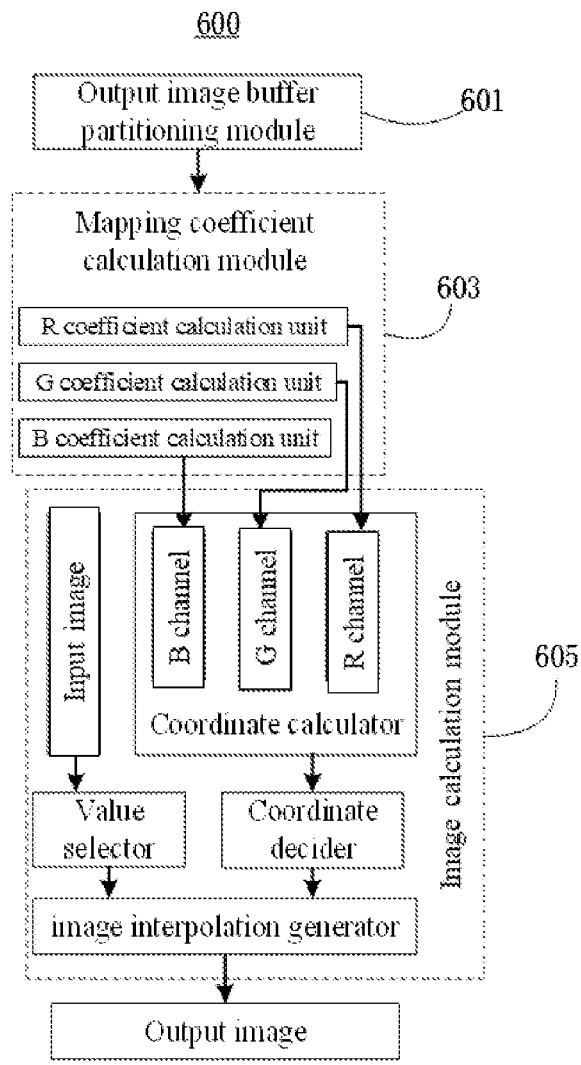
FIG. 6 is a block diagram of a real-time VR acceleration apparatus 600 according to an embodiment of the present invention.

FIG. 6 is a block diagram of a real-time VR acceleration apparatus 600 according to an embodiment of the present invention. The real-time VR acceleration apparatus 600 includes an output image buffer partitioning module 601, a mapping coefficient calculation module 603, and an image calculation module 605.

The output image buffer partitioning module 601 partitions an output image buffer into M rows and N columns of rectangular grid blocks, and outputs the vertex coordinates of all the grid blocks.

The mapping coefficient calculation module 603 includes an R component mapping coefficient calculation unit, a G component mapping coefficient calculation unit, and a B component mapping coefficient calculation unit that respectively calculate, according to an algorithm model integrating anti-distortion, anti-dispersion, and ATW, R, G, and B vertex coordinates in the input image that correspond to the R, G, and B vertex coordinates of the output image buffer grid blocks, and calculate the two-dimensional mapping coefficients of each pair of grid blocks in the output image buffer and the input image according to the R, G, and B vertex coordinates of the output image buffer grid blocks and the corresponding R, G, and B vertex coordinates of the input image grid blocks.

The image calculation module 605 includes a value selector, a coordinate calculator, a coordinate decider, and an image interpolation generator. The coordinate calculator includes an R component coordinate calculation unit, a G component coordinate calculation unit, and a B component coordinate calculation unit that respectively calculate, according to the two-dimensional mapping coefficients of the R, G, and B components that are calculated by the mapping coefficient calculation module, coordinates of R, G, and B components of the pixel in the input image that correspond to R, G, and B components of the pixel in the output image buffer. When the coordinates of the input image corresponding to R, G, and B components obtained by the coordinate calculator are out of the range of coordinates of the input image, the coordinate decider determines that the coordinates of the input image corresponding to the R, G, and B components obtained by the coordinate calculator are invalid. In this case, the pixel value of the output image pixel is 0. The value selector selects pixel values from the input image for interpolation calculation according to the valid coordinates determined by the coordinate decider. The image interpolation generator performs interpolation calculation according to data selected by the value selector, to generate the output image pixel values, and finally generates an image obtained after anti-distortion, anti-dispersion, and ATW. In a specific implementation, the output image buffer partitioning module 601 and the mapping coefficient calculation module 603 may be implemented by software. The image calculation module 605 may be directly completed by hardware. Processes such as anti-distortion, anti-dispersion online, and ATW are implemented online. Only data reading is needed, and data writing is not needed, thereby decreasing bandwidth and power consumption, decreasing delay, and reducing dizziness.

Figure 7:
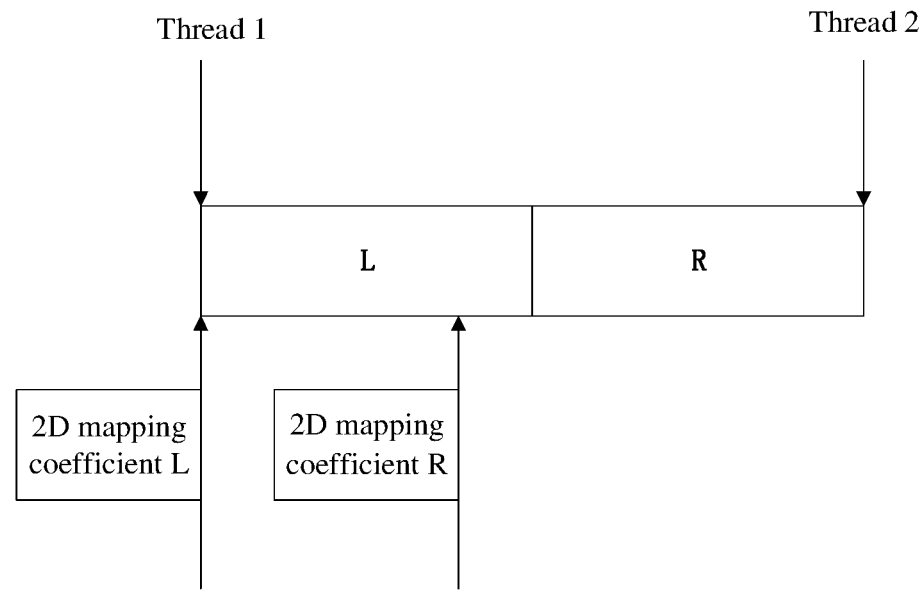
FIG. 7 is a schematic diagram of left and right eye buffers calculation process according to an embodiment of the present invention.

In an implementation, when the two-dimensional mapping coefficients of a grid block in the output image buffer and a grid block in the input image are calculated, for a single-screen solution, the manner in FIG. 7 may be used. There are left and right eye buffers. Calculation of a two-dimensional mapping coefficient of the right eye buffer only needs to be completed no later than a time of $7/16$ frame. In this way, the coefficient calculation workload may be properly reduced without generating image delay.

Figure 8:
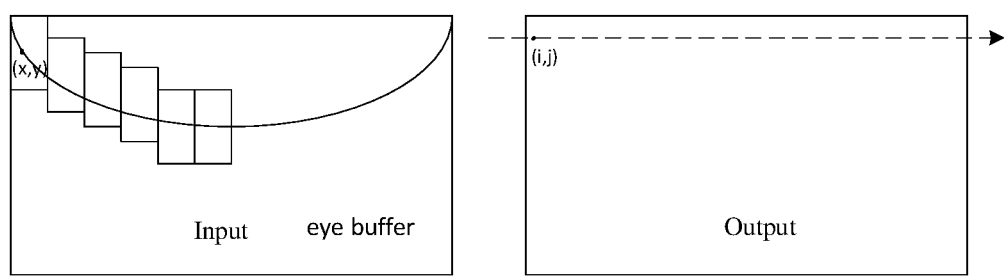
FIG. 8 is a schematic diagram of block partitioning and value selecting of an input image according to an embodiment of the present invention.

As shown in a right figure in FIG. 8, a screen displays and outputs according to scanning line by line. A row of data output is corresponding to the input as a curve in a left figure in FIG. 8. The hardware accesses data when selecting values, and needs to open up a line buffer for storing. At least a line buffer of a rectangular region from the top transverse line to the bottom of the curve shown in the left figure in FIG. 8 needs to be opened up. It is assumed that the width of the input image is 200, the depth of the curve is 40, then the line buffer needs to be in a size of 200*40 to load the curve.

In an implementation, considering that the output buffer is scanning line by line and output is needed to be online, in order to reduce the numbers of line buffer and reduce the area, value selection may be performed on the input image according to the partitioning manner shown in FIG. 8. The input curve is partitioned into blocks and covered, to reduce the numbers of line buffer to be opened up. It is assumed that a size of each block in a left figure in FIG. 8 is γ pixels. A height of a block may be determined based on the algorithm model of various anti-distortion, anti-dispersion, and ATW, and γ value operation collection. γ is only a reference value. A smaller block can reduce the quantity of rows of the line buffer. In this way, costs of the quantity of rows of the line buffer are reduced. A total width of the line buffer is determined by the maximum value of an input image resolution width and an output image width. For example, 1280 pixels width is sufficient to support dual-screen 1080 P.

In a specific implementation, it is assumed that the width of a small block in the left figure in FIG. 8 is 32, a total height of the line buffer may need only 16. That is, the line buffer only needs to be opened up as 200*16. If the blocks are partitioned to be smaller, for example, the width of the small block becomes 16, the total height of the line buffer may become 8, so that the line buffer opened up becomes 200*8. In this way, line buffer costs of hardware design are greatly reduced, and a design area is reduced.

It should be understood that the embodiments above are merely used to describe the technical solutions of the present invention, and are not intended to limit the present invention. For a person skilled in the art, modifications may be made to the technical solutions recorded in the foregoing embodiments, or equivalent replacements may be made on some of the technical features therein. These modifications or replacements shall fall within the protection scope of the claims of the present invention.

What is claimed is:

1. A real-time virtual reality (VR) acceleration method, comprising the following steps:
   step 1: obtaining an input image;
   step 2: partitioning an output image buffer into M rows and N columns of rectangular grid blocks, and outputting vertex coordinates of the rectangular grid blocks;
   step 3: calculating, according to an algorithm model integrating anti-distortion, anti-dispersion, and asynchronous time warping (ATW), vertex coordinates of input image grid blocks that correspond to the vertex coordinates of the output image buffer grid blocks;
   step 4: calculating two-dimensional mapping coefficients of each pair of grid blocks in the output image buffer and the input image according to the vertex coordinates of the output image buffer grid blocks and the corresponding vertex coordinates of the input image grid blocks;
   step 5: calculating, according to the two-dimensional mapping coefficients, coordinates of an input image pixel corresponding to an output image pixel;
   step 6: selecting pixel values of at least four pixels adjacent to the coordinates of the input image pixel corresponding to the output image pixel, to calculate a pixel value of the output image pixel; and
   step 7: outputting an image obtained after the anti-distortion, the anti-dispersion, and the ATW.

2. The real-time VR acceleration method according to claim 1, wherein the input image in the step 1 is a video image after spherical transformation.

3. The real-time VR acceleration method according to claim 1, wherein the values of M and N in the step 2 each are a power of 2.

4. The real-time VR acceleration method according to claim 1, wherein the step 4 includes: calculating two-dimensional mapping coefficients of R, G, and B components of the pair of grid blocks in the output image buffer and the input image according to the vertex coordinates of the output image buffer grid blocks and the corresponding vertex coordinates of the input image grid blocks.

5. The real-time VR acceleration method according to claim 4, wherein the step 5 includes: respectively calculating, according to the two-dimensional mapping coefficients of the R, G, and B components, coordinates of R, G, and B components of the input image pixel that correspond to R, G, and B components of the output image pixel.

6. The real-time VR acceleration method according to claim 1, wherein the step 5 of calculating, according to the two-dimensional mapping coefficients, coordinates of an input image pixel corresponding to an output image pixel is completed by hardware circuit.

7. The real-time VR acceleration method according to claim 1, wherein the step 6 of selecting pixel values of at least four pixels adjacent to the coordinates of the input image pixel corresponding to the output image pixel, to calculate a pixel value of the output image pixel is completed by hardware circuit.

8. The real-time VR acceleration method according to claim 1, wherein the step 6 includes: selecting the pixel values of the at least four pixels adjacent to the coordinates of the input image pixel corresponding to the output image pixel, and performing interpolation calculation by using a bilinear interpolation algorithm or a bicubic interpolation algorithm, to calculate the pixel value of the output image pixel.

9. The real-time VR acceleration method according to claim 1, wherein the image that is output in the step 7 and that is obtained after anti-distortion, anti-dispersion, and ATW is directly displayed after image synthesis.

10. A real-time virtual reality (VR) acceleration apparatus, comprising:
   an input image buffering module, configured to receive and store an input image;
   an output image buffer partitioning module, configured to partition an output image buffer into M rows and N columns of rectangular grid blocks, and output vertex coordinates of all the grid blocks;
   a mapping coefficient calculation module, configured to calculate, according to an algorithm model integrating anti-distortion, anti-dispersion, and asynchronous time warping (ATW), vertex coordinates of input image grid blocks that correspond to the vertex coordinates of the output image buffer grid blocks; and calculate two-dimensional mapping coefficients of each pair of grid blocks in the output image buffer and the input image according to the vertex coordinates of the output image buffer grid blocks and the corresponding vertex coordinates of the input image grid blocks; and
   an image calculation module, configured to calculate, according to the two-dimensional mapping coefficients, coordinates of an input image pixel corresponding to an output image pixel; select pixel values of at least four pixels adjacent to the coordinates of the input image pixel corresponding to the output image pixel, to calculate a pixel value of the output image pixel; and finally output an image obtained after the anti-distortion, the anti-dispersion, and the ATW.

11. The real-time VR acceleration apparatus according to claim 10, wherein the input image is a video image after spherical transformation.

12. The real-time VR acceleration apparatus according to claim 10, wherein the values of M and N each are a power of 2.

13. The real-time VR acceleration apparatus according to claim 10, wherein the mapping coefficient calculation module comprises:
   a vertex coordinate calculation unit, configured to calculate, according to the algorithm model integrating the anti-distortion, the anti-dispersion, and the ATW, the vertex coordinates of the input image grid blocks that correspond to the vertex coordinates of the output image buffer grid blocks; and
   a mapping coefficient calculation unit, configured to calculate the two-dimensional mapping coefficients of the pair of grid blocks in the output image buffer and the input image according to the vertex coordinates of the output image buffer grid blocks and the corresponding vertex coordinates of the input image grid blocks.

14. The real-time VR acceleration apparatus according to claim 13, wherein the mapping coefficient calculation unit comprises an R component mapping coefficient calculation unit, a G component mapping coefficient calculation unit, and a B component mapping coefficient calculation unit.

15. The real-time VR acceleration apparatus according to claim 10, wherein the calculating, by the image calculation module according to the two-dimensional mapping coefficients, coordinates of an input image pixel corresponding to an output image pixel; and selecting pixel values of at least four pixels adjacent to the coordinates of the input image pixel corresponding to the output image pixel, to calculate a pixel value of the output image pixel are completed by hardware circuit.

16. The real-time VR acceleration apparatus according to claim 15, wherein the image calculation module comprises:
   a coordinate calculator, configured to calculate, according to the two-dimensional mapping coefficients, the coordinates of the input image pixel corresponding to the output image pixel;
   a coordinate decider, configured to determine whether the coordinates obtained by the coordinate calculator are valid, wherein when the coordinates calculated by the coordinate calculator are out of a range of the coordinates of the input image, the coordinate decider determines that the coordinates of the input image pixel corresponding to the output image pixel are invalid, and the pixel value of the output image pixel is 0;
   a value selector, configured to select, from the input image, pixel values of at least four pixels adjacent to valid coordinates determined by the coordinate decider; and
   an image interpolation generator, configured to perform interpolation calculation according to the pixel values selected by the value selector, to calculate the pixel value of the output image pixel, and finally generate the image after the anti-distortion, the anti-dispersion, and the ATW.

17. The real-time VR acceleration apparatus according to claim 16, wherein the coordinate calculator comprises an R component coordinate calculation unit, a G component coordinate calculation unit, and a B component coordinate calculation unit.

18. The real-time VR acceleration apparatus according to claim 17, wherein when coordinates of the input image corresponding to R, G, and B components obtained by the coordinate calculator are out of the range of the coordinates of the input image, the coordinate decider determines that the coordinates of the input image corresponding to the R, G, and B components obtained by the coordinate calculator are invalid, and the pixel value of the output image pixel is 0.

19. The real-time VR acceleration apparatus according to claim 16, wherein the image interpolation generator comprises a bilinear interpolation calculator or a bicubic interpolation calculator, configured to perform the interpolation calculation according to the pixel values selected by the value selector, to calculate the pixel value of the output image pixel, and finally generate the image after the anti-distortion, the anti-dispersion, and the ATW.

20. The real-time VR acceleration apparatus according to claim 10, wherein the image that is output by the image calculation module and that is obtained after the anti-distortion, the anti-dispersion, and the ATW is directly displayed after image synthesis.

21. The real-time VR acceleration method according to claim 2, wherein the image that is output in the step 7 and that is obtained after anti-distortion, anti-dispersion, and ATW is directly displayed after image synthesis.

22. The real-time VR acceleration method according to claim 3, wherein the image that is output in the step 7 and that is obtained after anti-distortion, anti-dispersion, and ATW is directly displayed after image synthesis.

23. The real-time VR acceleration method according to claim 4, wherein the image that is output in the step 7 and that is obtained after anti-distortion, anti-dispersion, and ATW is directly displayed after image synthesis.

24. The real-time VR acceleration method according to claim 5, wherein the image that is output in the step 7 and that is obtained after anti-distortion, anti-dispersion, and ATW is directly displayed after image synthesis.

25. The real-time VR acceleration method according to claim 6, wherein the image that is output in the step 7 and that is obtained after anti-distortion, anti-dispersion, and ATW is directly displayed after image synthesis.

26. The real-time VR acceleration method according to claim 7, wherein the image that is output in the step 7 and that is obtained after anti-distortion, anti-dispersion, and ATW is directly displayed after image synthesis.

27. The real-time VR acceleration method according to claim 8, wherein the image that is output in the step 7 and that is obtained after anti-distortion, anti-dispersion, and ATW is directly displayed after image synthesis.

28. The real-time VR acceleration apparatus according to claim 11, wherein the image that is output by the image calculation module and that is obtained after the anti-distortion, the anti-dispersion, and the ATW is directly displayed after image synthesis.

29. The real-time VR acceleration apparatus according to claim 12, wherein the image that is output by the image calculation module and that is obtained after the anti-distortion, the anti-dispersion, and the ATW is directly displayed after image synthesis.

30. The real-time VR acceleration apparatus according to claim 13 wherein the image that is output by the image calculation module and that is obtained after the anti-distortion, the anti-dispersion, and the ATW is directly displayed after image synthesis.

31. The real-time VR acceleration apparatus according to claim 14, wherein the image that is output by the image calculation module and that is obtained after the anti-distortion, the anti-dispersion, and the ATW is directly displayed after image synthesis.

32. The real-time VR acceleration apparatus according to claim 15, wherein the image that is output by the image calculation module and that is obtained after the anti-distortion, the anti-dispersion, and the ATW is directly displayed after image synthesis.

33. The real-time VR acceleration apparatus according to claim 16, wherein the image that is output by the image calculation module and that is obtained after the anti-distortion, the anti-dispersion, and the ATW is directly displayed after image synthesis.

34. The real-time VR acceleration apparatus according to claim 17, wherein the image that is output by the image calculation module and that is obtained after the anti-distortion, the anti-dispersion, and the ATW is directly displayed after image synthesis.

35. The real-time VR acceleration apparatus according to claim 18, wherein the image that is output by the image calculation module and that is obtained after the anti-distortion, the anti-dispersion, and the ATW is directly displayed after image synthesis.

36. The real-time VR acceleration apparatus according to claim 19, wherein the image that is output by the image calculation module and that is obtained after the anti-distortion, the anti-dispersion, and the ATW is directly displayed after image synthesis.

* * * * *